(12) United States Patent
Vuorisalo et al.

(10) Patent No.: US 8,128,903 B2
(45) Date of Patent: Mar. 6, 2012

(54) METHOD OF TREATING A PRECIPITATE COMPRISING IRON (II) SULFATE MONOHYDRATE, A PLANT, GRANULAR MATERIAL AND ITS USES

(75) Inventors: Juhatuomas Vuorisalo, Noormarkku (FI); Joni Pärnänen, Pori (FI)

(73) Assignee: Sachtleben Pigments Oy, Helsinki (FI)

( * ) Notice: Subject to any disclaimer, the term of this patent is extended or adjusted under 35 U.S.C. 154(b) by 436 days.

(21) Appl. No.: 12/306,167

(22) PCT Filed: Jun. 25, 2007

(86) PCT No.: PCT/FI2007/000177
§ 371 (c)(1),
(2), (4) Date: Jan. 26, 2009

(87) PCT Pub. No.: WO2008/000887
PCT Pub. Date: Jan. 3, 2008

(65) Prior Publication Data
US 2009/0301356 A1 Dec. 10, 2009

(30) Foreign Application Priority Data

Jun. 28, 2006 (EP) ..................................... 06116202
Jun. 28, 2006 (FI) ..................................... 20060624

(51) Int. Cl.
*C01B 17/96* (2006.01)
*C01G 49/00* (2006.01)
*C04B 11/00* (2006.01)
*C09C 1/22* (2006.01)

(52) U.S. Cl. ........ 423/544; 423/555; 423/558; 210/723; 210/749; 106/713; 106/735; 106/752

(58) Field of Classification Search ................... 423/544, 423/555, 558; 210/723, 749; 106/713, 735, 106/752
See application file for complete search history.

(56) References Cited

U.S. PATENT DOCUMENTS 1,715,877 A * 6/1929 Travers ......................... 210/723
(Continued)

FOREIGN PATENT DOCUMENTS
DE    1 160 456    1/1964
(Continued)

OTHER PUBLICATIONS

Lödige, "Systemlösungen für die Umwelttechnik" (Jan. 2003) with corresponding English brochure.
(Continued)

*Primary Examiner* — Timothy Vanoy
(74) *Attorney, Agent, or Firm* — James C. Lydon

(57) ABSTRACT

The invention relates to a method of controlling the solubility of granular material by treating a precipitate comprising iron (II)sulphate monohydrate originating from titanium dioxide production, in which method the reaction temperature is allowed to increase at the most to a temperature of 120° C., to a plant for treating a precipitate comprising iron(II)sulphate monohydrate, to a product and its uses. A typical method according to the invention comprises the steps of mixing water to the reaction mixture in the said mixing apparatus, and keeping the amount of neutralizing agent sufficient to give a pH value from 1.5 to 4, preferably from 1.5 to 3, to the end product in order to obtain a granular material having a high soluble iron(II) content or keeping the amount of neutralizing agent sufficient to give a pH value $\geq 9$ to the end product in order to obtain a granular material having a low solubility.

24 Claims, 1 Drawing Sheet

U.S. PATENT DOCUMENTS

Figure 1:
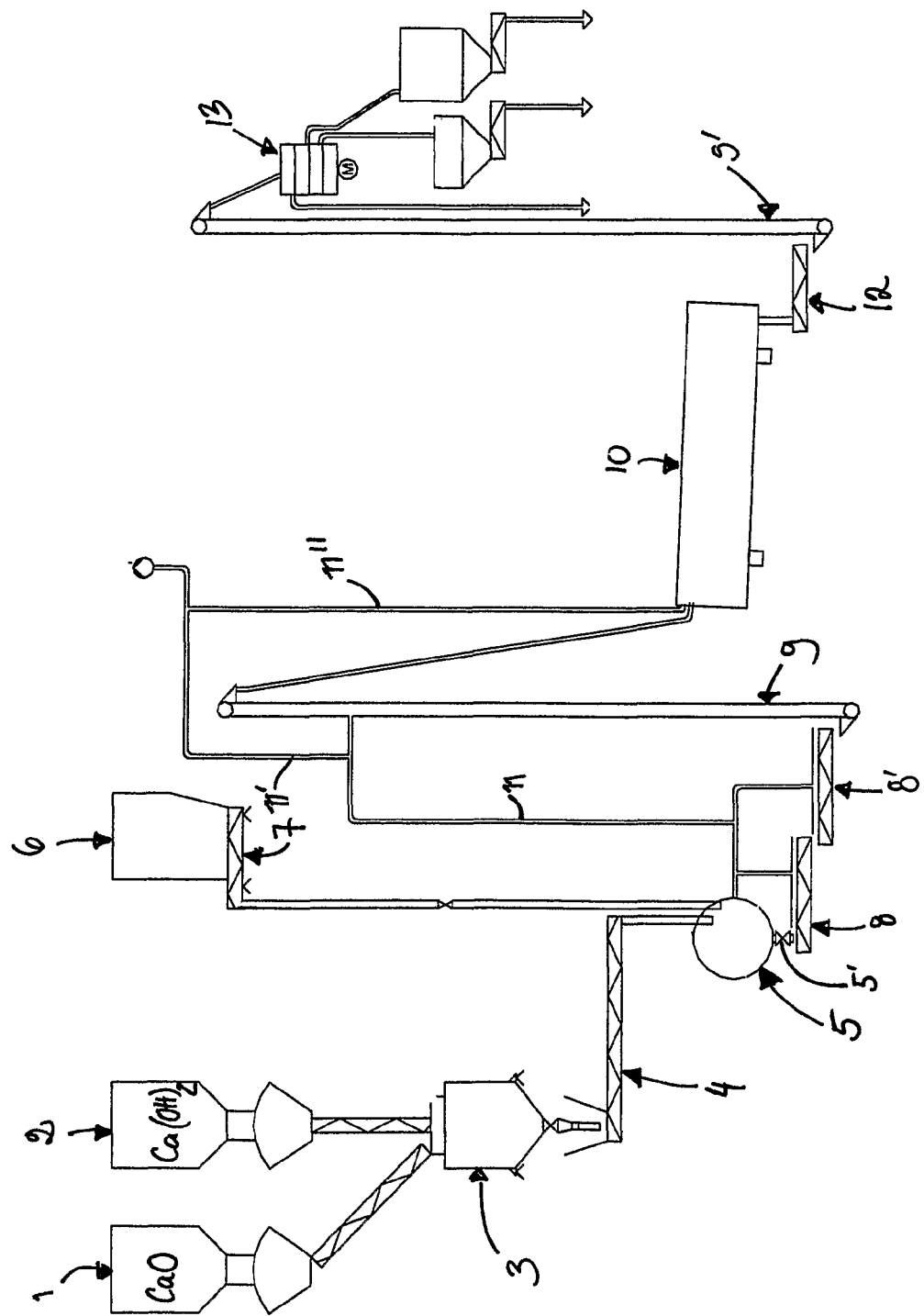

| | | | |
|---|---|---|---|
| 4,208,393 A * | 6/1980 | LeBel | 423/555 |
| 4,292,085 A | 9/1981 | Piccolo et al. | 106/109 |
| 5,514,201 A | 5/1996 | Marijuan de Santiago et al. | 71/21 |
| 5,766,301 A | 6/1998 | Marijuan de Santiago et al. | 71/11 |
| 7,185,835 B2 | 3/2007 | Aichinger et al. | 241/21 |
| 7,207,507 B2 | 4/2007 | Aichinger et al. | 241/34 |
| 2002/0179539 A1 * | 12/2002 | Panning et al. | 210/749 |
| 2007/0039522 A1 | 2/2007 | Vossing et al. | 106/815 |
| 2008/0282939 A1 | 11/2008 | Kehrmann | 106/805 |

FOREIGN PATENT DOCUMENTS

| | | |
|---|---|---|
| DE | 42 19 351 | 12/1992 |
| EP | 0 132 820 | 6/1988 |
| EP | 0 301 261 | 2/1989 |
| EP | 0 301 262 | 2/1989 |
| EP | 1544182 | 6/2005 |
| EP | 1559694 | 8/2005 |
| WO | WO 96/33133 | 10/1996 |
| WO | WO 9633133 * | 10/1996 |
| WO | WO 2005/009917 | 2/2005 |

OTHER PUBLICATIONS

Eirich, "Technologien für den Unweltschutz" (Jul. 2006) with translation.

Eirich, "Evactherm® Aufbereitung von Ferriten" (Mar. 2003) with translation.

Lödige, "Kontinuierlicher Pflugschar®—Mischer" (Nov. 7, 2008) with corresponding English brochure.

Kronos Ecochem, "Produkte and Anwendungen" (2002) with translation.

Rieschel et al. "Vergleich verschiedener Prüfmethoden zur Qualitätsprufung von Kaligranulat" (Sep. 1981).

Kronos Ecochem, "Ferrogranul 30 Ferropowder 30" (2002) with translation of brochure.

\* cited by examiner

METHOD OF TREATING A PRECIPITATE COMPRISING IRON (II) SULFATE MONOHYDRATE, A PLANT, GRANULAR MATERIAL AND ITS USES

The invention relates to a method of controlling the solubility of granular material by treating a precipitate comprising iron(II)sulphate monohydrate originating from titanium dioxide production, in which method the reaction temperature is allowed to increase at the most to a temperature of 120° C., to a plant for treating a precipitate comprising iron(II) sulphate monohydrate, to a product and its uses, as described in the preambles of the enclosed independent claims.

Titanium dioxide is commonly manufactured by using a sulphate process, where an ore comprising titanium and iron is treated with sulphuric acid. In the first stage of the process, the ground ore is digested in concentrated sulphuric acid, whereby the titanium in the ore is converted to soluble titanyl sulphate.

The solid sulphate cake is then dissolved in weak sulphuric acid after which titanium containing liquor is purified and concentrated ready for hydrolyzation. The solid titanic acid precipitate is separated from acidic mother liquor by filtration.

The sulphuric acid based mother liquor, which is reused at digestion after concentration comprises dissolved iron and has an acid concentration of 20-25%. The acid concentration comprises removal of iron and several concentration steps. The dissolved iron is first removed as ferrous sulphate heptahydrate, i.e. copperas, from the sulphuric acid by crystallization followed by acid concentration with vacuum evaporators. After these steps the sulphuric acid obtains an acid concentration of about 55% and it typically comprises an insoluble first precipitate comprising ferrous sulphate monohydrate and about 20 weight-% of acid. This first precipitate is filtrated and separated from 55% acid. After the removal of the first precipitate from 55% acid, the remaining sulphuric acid is concentrated further, so that a sulphuric acid having an acid concentration of about 70% is obtained. During this second concentration step a second precipitate is formed, comprising ferrous sulphate monohydrate and about 25-30 weight-% of acid. The second precipitate is also filtrated and thus separated from the 70% acid. Both separated precipitates are nowadays mixed with lime for neutralization and dumped. The amounts of waste that are created are enormous and the safe deposit of the created waste is problematic. The problem has been that some metals and unneutralized acid could have been dissolved from the waste during long-term storage on the spoil deposit.

Cement is a combination of calcium, silicate, aluminium, iron and small amounts of other ingredients, which are mixed homogenously and ground to a suitable degree of coarseness. Cement typically comprises also small amounts of chromium (VI)compounds. Dissolved chromium(VI) is known to cause allergic reactions in humans and due to occupational safety the amount of Cr(VI) should be as low as possible. The amount of Cr(VI) can be minimized by reducing it to chromium(III). Chromium(III) is practically insoluble in water in the cement-water mixture, so it is harmless for the persons working with cement.

It is known to add dried ferrous sulphate heptahydrate to a dry cement mixture in order to reduce Cr(VI) to Cr(III). The use of dried ferrous sulphate heptahydrate has been problematic as it is dusting and it has a low melting point. Ferrous sulphate heptahydrate has also a tendency to absorb water, which causes difficulties in its handling and storage.

WO 96/33133 discloses a method for treating ferrous sulphate obtained as a side product from titanium dioxide manufacture in order to prepare ferrous sulphate monohydrate usable for chromium reduction in cement manufacture. In the method the acid containing ferrous sulphate is neutralized with a CaO containing material, the amount of the CaO containing material being such that a pH value from 1.5 to 5 is obtained for the end product. The reaction temperature is allowed to increase to at the most 120° C. Impure cement mixture comprising e.g. fly ash is used as the CaO containing material. One of the drawbacks is that the impurities in the cement reduce the amount of iron in the end product. When the end product is used as an additive in the cement industry, a large amount of additive is needed in order to reduce the Cr(VI) to the required level due to the low iron concentration. Also, the obtained end product is powdery and difficult to handle.

WO 2005/009917 discloses a method for producing a reducing agent for the soluble chromate in the cement. In the method a sulphuric acid from e.g. titanium dioxide manufacture is concentrated in order to obtain a precipitate containing iron(II)sulphate. The acid bound to the precipitate is minimized by washing away or whole or partial neutralization. The removal of the acid requires expensive and complicated equipment. Furthermore, the neutralization easily produces powdery material, which is difficult to handle. On the other hand, WO 2005/009917 proposes an addition of iron(II)sulphate heptahydrate to the washed or neutralized iron(II)sulphate monohydrate. However, this requires a long mixing time and leads probably to formation of a hard cake, which might need separate crushing step in order to obtain a product suitable to be used in the cement manufacture.

EP 0301 262 discloses a method for treating waste obtained from manufacture of titanium dioxide in order to obtain granular material having a low solubility. Dry waste and finely comminuted calcium oxide are mixed at the temperature of at least 110° C. so that a homogenous dry powder is obtained. This powder is granulated in separate pelletizing apparatus, into which water is added. The described method is complicated and requires a plurality of different process steps.

The object of the present invention is to solve or minimize the problems and disadvantages existing in the prior art.

One object of the present invention is to provide a simple method for controlling the solubility of granular material by treating a precipitate comprising iron(II)sulphate monohydrate originating from titanium dioxide production.

Another object of the present invention is to provide a method, with which in a minimum amount of time a relatively homogenous material in granule form can be produced without extensive pre-treatment of the used raw materials.

Another object of the present invention is to provide a granular material that shows a high content of soluble iron and is suitable to be used as a reducing agent in the cement manufacture, so that the amount of waste from the titanium dioxide production process is reduced.

Still another object of the present invention is to provide a method with which a granular material having a low solubility can be produced simply and by using a minimum amount of process steps in order to provide a waste product that can be safely deposited.

In order to achieve the above-mentioned objects the present invention is characterized in what is defined in the characterizing parts of the independent claims presented hereafter.

In a typical method for controlling the solubility of granular material, the method comprises:

obtaining an amount of a crude precipitate comprising iron(II)sulphate monohydrate and sulphuric acid from titanium dioxide production, mixing the said precipitate and a neutralizing agent in a mixing apparatus to obtain a reaction mixture, the temperature during mixing of the reaction mixture being allowed to increase at the most to a temperature of 120° C., mixing water to the reaction mixture in the said mixing apparatus, and keeping the amount of neutralizing agent sufficient to give a pH value from 1.5 to 4, preferably from 1.5 to 3, to the end product in order to obtain a granular material having a high soluble iron(II) content or keeping the amount of neutralizing agent sufficient to give a pH value $\geq 9$ to the end product in order to obtain a granular material having a low solubility.

A typical plant for producing granular material and treating a precipitate comprising ferrous sulphate monohydrate originating from titanium dioxide production, comprising at least one high shear rate mixing apparatus capable of mixing liquid, paste-like and solid material, comprising a first end and a second end, and having a main mixing arm, a first feeding connection for crude precipitate comprising iron(II)sulphate monohydrate and sulphuric acid, a second feeding connection for neutralizing agent, a third feeding connection for water and an output connection, means for transporting the material from the output connection of the mixing apparatus, an after-cooler apparatus.

A typical product has an iron(II) content of 12-18 weight-%, preferably 14-18 weight-%, and comprises gypsum, the dusting value for the product fraction having a diameter in the range of 1-7 mm being lower than 1000 mg/kg.

The typical granular product according to the present invention having high soluble iron content is used in cleaning of effluent or sewage water, as a reducing agent in cement manufacture, or as flocculation agent. The typical granular product having a low solubility is used as spoil material.

In the context of the present application the expression "having a high soluble iron(II) content" means that the material comprises at least 12 weight-%, typically 12.5-18 weight-%, more typically 13-18 weight-%, often 14-18 weight-%, sometimes 14-17.7 weight-% or 15-18 weight-% (calculated of the weight of the granule) iron(II) compounds.

In the context of the present application the expression "having a low solubility" means material that analysed according to the shaling test of the standard SFS-EN 12457-2 "Characterization of waste. Leaching. Compliance test for leaching of granular waste materials and sludges. Part 2: One stage batch test at a liquid to solid ratio of 10 l/kg for materials with particle size below 4 mm (without or with size reduction)", dated Dec. 2, 2002, fulfills the requirements of landfill class A as defined in the European Union's Council Decision 2003/33/EC establishing criteria and procedures for the acceptance of waste at landfills pursuant to article 16 of and Annex II to Directive 1999/31/EC (date of the text Dec. 19, 2002), i.e. the leaching values for the material are lower than the limiting values given in the Council Decision.

Insolubility of the high soluble granules can be measured as follows:

About 16.5 g of ground granules are weighed to 1 liter decanter with 1 mg accuracy. 500 ml 1 weight-% $H_2SO_4$ is added and kept under magnetic stirring for 30 minutes. Solution is filtered to a weighed 8 µm filter membrane, dried in an exsiccator before filtering. Filter is rinsed with distilled water.

Filter membrane with the filtrated unsoluble material is dried in a heating chamber at 105° C. for 1 hour, cooled in an exsiccator and weighed with 1 mg accuracy. The amount of unsoluble material is calculated according to the formula:

$$\text{Unsoluble material \%}=[(m_{j+k}-m_k)/m_n]\times 100$$

where $m_{j+k}$=dried filtrate+membrane $m_k$=membrane $M_n$=mass of the sample

Now it has been surprisingly found out that by adding water to the reaction mixture comprising neutralizing agent and crude precipitate from titanium dioxide process it is possible to provide a fast and efficient method for producing granular material. Surprisingly, it has also been found out that a careful adjustment in amount of the neutralizing agent in order to control the pH of the end product enables also the simultaneous control of the solubility characteristics of the end product. It has also been found out that it is not necessary to minimize the amount of acid in the ferrous sulphate monohydrate which is used as a raw material before the mixing operation. The acid present in the crude precipitate improves at least some of the physical properties, such as dusting value, of the obtained granules. Therefore, preferably the crude precipitate used as the raw material in process is obtained from the manufacture of titanium dioxide untreated, undried or unreduced.

According to the first aspect of the invention the neutralizing agent is added in an amount sufficient to give a pH value from 1.5 to 4, preferably from 1.5 to 3, to the end product in order to obtain a granular material having a high soluble iron(II) content. It has been noticed that the sulphuric acid present in the crude ferrous sulphate monohydrate enhances the high level of soluble iron(II) compounds in the end product. According to one preferred embodiment of the present invention the method of producing granular material having a high soluble iron(II) content comprises:

obtaining an amount of a crude precipitate comprising iron(II)sulphate monohydrate and sulphuric acid from titanium dioxide production, mixing the said precipitate and a neutralizing agent in a mixing apparatus to obtain a reaction mixture, the temperature during mixing of the reaction mixture being allowed to increase at the most to a temperature of 120° C., mixing water to the reaction mixture in the same mixing apparatus, and keeping the amount of neutralizing agent sufficient to give a pH value from 1.5 to 4, preferably from 1.5 to 3, to the end product.

According to the second aspect of the invention the neutralizing agent is added in an amount sufficient to give a pH value $\geq 9$ to the end product in order to obtain a granular material having a low solubility. In this way the metal ions present in the crude precipitate are converted to hydrate compounds having a low solubility, such as $Fe(OH)_3$, $Ti(OH)_4$, $Mg(OH)_2$, $Mn(OH)_2$, $Al_2(OH)_3$, $Ni(OH)_2$. Iron(II) in the crude precipitate is oxidized to iron(III) and sulphate is converted to low soluble gypsum, $CaSO_4$. According to another preferred embodiment of the present invention the method for producing a product with low solubility comprises mixing in a mixing apparatus a neutralizing agent to a crude precipitate comprising iron(II)sulphate monohydrate and sulphuric acid from titanium dioxide production, adding water to the obtained mixture under high shear mixing in order to form granules, whereby the neutralizing agent and water are added to the said mixing apparatus without separate granulation step.

When the temperature is raised in the process during the neutralization of the acid in the crude precipitate, a granular product is formed during the mixing action when water is added to the mixing apparatus. Thus the product is obtained fast and efficiently and no additional process steps are needed for minimization of the acid in the crude precipitated ferrous sulphate monohydrate before the mixing action. There does not exist a need for prolonged drying of the obtained product or normally a need for separate granulation of the product, either. One of the surprising advantages of the present invention is that the water needed for the granulation can be added to the neutralized crude precipitate directly, even to the same mixing apparatus where the neutralization reaction is taking place. There is no need for separate granulation or pelletizing steps, which greatly simplifies the process. As the number of separate apparatuses is fewer, plant space is spared, which naturally decreases the production costs. Simple apparatuses are also more reliable, because the number of possibly malfunctioning parts, such as clogging pipelines, is reduced.

Typically the granules that are obtained have a diameter of 0.5 mm or more, normally in the range of 1-10 mm. After the formation of the granular material, the obtained product can be cooled and it can be screened or sieved in order to separate the main granule fraction having a diameter of 0.5 to 9 mm. It is also possible to recover a separate powdery material fraction. As a powdery material is here understood the material fraction that passes through 0.5 mm sieve. As granular material or main granule fraction is here understood the granule material fraction that does not pass 0.5 mm sieve. The main granule fraction comprises >80 weight-% of the obtained material, typically >85 weight-% of the produced material. Typically over 80 weight-% of the material comprises granules having a diameter more than 1 mm but less than 7 mm. Preferably, the obtained main granule fraction of the obtained product is after screening or sieving appropriately packed for storage and transport when granular material having a high soluble iron(II) content is produced. The powdery material fraction can be used as additive in manufacture of mortar.

Advantageously, in the present invention the mixing of the crude precipitated ferrous sulphate monohydrate, neutralizing agent and water is conducted in one mixing apparatus. This means that mixing, neutralization, drying and granulation all occur in one mixing apparatus and partially concurrently. The whole process takes typically a few minutes to perform, i.e. the end product with good physical properties, such as flow properties, is obtained in a few minutes from starting the mixing of the untreated raw materials.

According to one embodiment of the invention the reaction mixture comprises crude precipitate comprising ferrous sulphate monohydrate typically 55-95 weight-%, more typically 60-80 weight-%, preferably 65-70 weight-%. Crude precipitated ferrous sulphate monohydrate comprises typically 15-30 weight-% of sulphuric acid.

As stated above, according to one especially preferred alternative crude precipitated ferrous sulphate monohydrate comprising sulphuric acid is unwashed, unreduced and unneutralized before its addition to the reaction or pre-reaction mixture. This means that it is not necessary to pre-treat the precipitate that is obtained from the titanium dioxide production, but it can be directly used for the manufacture of a product according to the invention. This simplifies the plant configuration and saves production time when fewer production steps are needed. At the same time the presence of acid in the ferrous sulphate precipitate reduces the possibility of conversion of the iron(II) into the iron(III) during the production of the end product, which is advantageous when granular material having high soluble iron(II) content is prepared.

According to one embodiment of the invention any crude precipitate originating from the concentration of the sulphuric acid to acid concentration 50-80% in the titanium dioxide production and comprising iron(II)sulphate monohydrate and sulphuric acid can be used in the invention. Both precipitated ferrous sulphate monohydrate originating from the concentration step of 55% sulphuric acid or 70% sulphuric acid in the titanium dioxide production, or their mixture, can be used in the invention. According to one embodiment of the invention the precipitated ferrous sulphate monohydrate originating from the concentration step of 55% sulphuric acid is used, as the precipitate from 55% acid concentration step comprises a lower amount of acid and a higher amount of iron(II) than ferrous sulphate monohydrate originating from the concentration step of 70% sulphuric acid. Typically the precipitate from the concentration step of 55% sulphuric acid comprises around 15-17 weight-% of iron(II) and 15-25 weight-% acid. Consequently the neutralisation of the precipitate from 55% acid concentration step also reduces the amount of neutralising agent that is needed and reduces the reaction temperature. As the amount of acid is lower, a lower amount of neutralizing agent is needed, leading to lower gypsum concentration in the end product and to higher iron(II) concentration. Typically the precipitate from the concentration step of 70% sulphuric acid comprises around 13-15 weight-% of iron(II) and 25-30 weight-% of acid.

It is also possible to use a mixture of precipitates from different concentration steps. This makes it also possible to control the iron(II) content of the obtained end product. A greater amount of crude precipitate originating from the concentration step to 55% sulphuric acid, the higher iron(II) content is obtained to the granular material. In principle, the crude precipitates from the different concentration steps may be used in any proportion to each other. A typical proportion of the precipitated ferrous sulphate monohydrate originating from the concentration step of 55% sulphuric acid to the precipitated ferrous sulphate monohydrate originating from the concentration step of 70% sulphuric acid is 1:2-1:1.

According to the first aspect of the invention the neutralizing agent is added to the ferrous sulphate monohydrate in such amount that the pH value is kept to a low level. The low pH promotes the high amount of soluble iron in the end product, as high pH value increases the conversion of iron(II) to iron(III), which is insoluble. Preferably the neutralizing agent is added in an amount sufficient to give a pH value from 1.6 to 3, typically from 1.7 to 2.7, more typically 1.8 to 2.5, sometimes from 1.7 to 2 to the end product. Typically the neutralizing agent is added to the reaction mixture in amounts 5-15 weight-% of active neutralising agent, more typically 7-14 weight-%, most typically 8-13 weight-%, sometimes 9-12.5 weight-% of active neutralising agent in order to obtain a granular product having high iron(II) content.

According to the second aspect of the invention, when preparing granular end product having a low solubility the neutralizing agent is preferably added in an amount sufficient to give a pH value from 9 to 13, typically from 9 to 12, more typically from 9.3 to 11.8, sometimes from 9.6 to 11.5 to the end product in order to obtain a granular material having a low solubility calculated as used crude precipitate. The neutralizing agent is usually added to the reaction mixture in an amount of 35-55 weight-%, or in an amount of 38-48 weight-%.

A potentiometric measurement can be used for determination of the pH value of the end product in solution. Measurement can be done by weighing 15.0 g carefully mixed product into a 200 ml plastic vessel. Thereafter 150 ml deionized water is added and the mixture is mixed with a magnetic stirrer for 20 minutes. The stirrer is removed, particles are allowed to sediment and the pH is measured from the clarified water phase.

The neutralizing agent which is used in the present invention is preferably a substance that forms gypsum under mixing of the reaction mixture. As gypsum is one of the "natural" constituents of cement mixture, this minimizes the amount of foreign, unnecessary or harmful compounds that are introduced to cement when the end product is used as reducing agent in cement manufacture. Suitable neutralizing agents are for example calcium hydroxide, dehydrated lime, calcium oxide, limestone, dolomite or their mixtures.

According to one preferred embodiment calcium or magnesium oxide is used as neutralizing agent. Use of relatively pure calcium or magnesium oxide as neutralizing agent enhances the amount of iron in the granules, as the use of relatively pure oxide minimizes the amount of unnecessary or even harmful impurities in the obtained product. Thus a typical iron(II) content of 15-17.5 weight-% in the obtained end product is easily achieved, and the production of granules of uniform quality is improved. When pure oxides are used it is possible to use smaller amounts of neutralizing agent, as the relatively pure oxides comprise smaller amounts of unreactive constituents, such as silicates or carbonates. Thus the neutralizing agent reacts effectively in the process and improves the overall performance of the process. The neutralizing agent may comprise 20-ca 100 weight-% CaO, typically 70-95 weight-% CaO, more typically 80-90 weight-% CaO. Use of relatively pure oxides is especially preferred when granular material having a high soluble iron(II) content is produced.

When manufacturing granules having a low solubility the neutralizing agent comprises mainly calcium hydroxide or calcium oxide. The used calcium hydroxide/calcium oxide is preferably finely comminuted, having typically $d_{50}$ of about 0.25 mm. Slaked lime or calcium carbonate, $CaCO_3$, can also be used as a neutralizing agent.

The reaction between the crude precipitate and the neutralizing agent may be very violent and exothermic, enhancing the effective drying and granulation of the reaction mixture. During the drying of the reaction mixture significant amounts of steam are generated. The steam is preferably dispatched from the reaction apparatus.

When calcium oxide is used as neutralizing agent the reaction temperature is high, usually around 105° C., which contributes to the high iron(II) content in the final product. When the reaction mixture reaches the temperature around 105° C. it usually solidifies fast.

According to one embodiment of the invention reduced temperature around 65° C. results in damp reaction mixture, which is formed into granules of irregular shape with a diameter of 3-10 mm.

Use of magnesium oxide as neutralizing agent results in an end product with improved solubility properties. During the neutralization reaction with magnesium oxide no insoluble gypsum is formed, which improves the overall characteristics of the end product for uses where high solubility is an asset and where gypsum itself is detrimental to the process, e.g. when the end product is used in water treatment and/or cleaning of effluents.

One of the important properties of the used raw materials is their water or moisture content. By adjusting the water content in the reaction mixture it is possible to control the granule formation and thus the final form of the obtained product. If used raw materials have high water content, the reaction mixture is damp and the obtained end product is formed as soft and irregular granules. Medium water content in the reaction mixture leads to effective formation of dry and hard granules. If the used raw materials are practically dry the end product is in the form of fine-grained powdery material.

The water content of the crude precipitate may vary due to the process conditions in titanium dioxide production. According to the present invention the reaction mixture's moisture content can be adjusted by addition of water to the reaction mixture through a liquid feeding connection arranged in the mixing apparatus. For example, water can be added in an amount of 10 weight-% to the reaction mixture before or after, preferably after the addition of the neutralizing agent. To a certain extent the granulation of the reaction mixture can be regulated by the amount of the added water. If dry raw materials are used, the material obtained is powdery. In that case, granules can be obtained by adding a sufficient amount of water. Typically the added water content in the reaction mixture giving granular material is in the range of 0.1-20 weight-%, typically 5-15 weight-%, even more typically 7.5-11 weight-%, sometimes 7-14 weight-%, calculated from used crude precipitate, when granular material having high soluble iron(II) content is produced.

According to the second aspect of the invention, when granular material having low solubility is produced water is added an amount of 40-60 weight-%, calculated as used crude precipitate. The added amount of water is chosen so that it is enough to precipitate the water soluble metal ions present in the crude precipitate as low soluble hydroxides. The amount of added water must also be such that the end humidity of the mixture is high enough for granulation. In case calcium oxide is used as neutralizing agent, the amount of water that is used for slaking is preferably added to the total amount of added water.

According to one embodiment of the invention a small amount of water, for example 1-3 weight-%, is added during the last mixing stage. This addition levels out the possible variations in the water content of the used raw materials, thus minimizing the need of extensive process adjustment.

Especially when manufacturing granular material with low solubility it is possible to use dirty circulation waters from titanium dioxide production as added water. These circulation waters usually comprise titanium and iron sulphates and sulphuric acid, but they may comprise also other metal sulphates. Circulation waters originate mainly from washing of obtained titanium or iron sulphate. Use of these circulation waters enables savings in clean process water and offers simultaneously practical use for these waters that otherwise would be difficult to treat.

As explained, by using the method according to the present invention it is possible to obtain dry hard granules in a controlled manner. The present invention also enables the control and adjustment of the properties of the end product by a proper selection of the different process parameters. Thus the end product can be, at least partially, tailored to fulfill the specific needs of the end application. Suitable process parameters that can be adjusted are, for example, the quality of the mixing, mixing time, proportions of different raw materials and properties of the used raw materials.

According to one embodiment of the invention ferrous sulphate heptahydrate can be used as additive in the production of the granules. An amount of ferrous sulphate heptahydrate originating from titanium dioxide production is mixed with the said crude precipitate comprising iron(II)sulphate monohydrate and sulphuric acid before or during the addition of the neutralization agent, the amount of added heptahydrate being 1-35 weight-%, more typically 15-30 weight-%, preferably 20-25 weight-% in order to obtain a granular material having a high soluble iron(II) content. The ferrous sulphate heptahydrate can be added to crude precipitated ferrous sulphate monohydrate at the same time with the neutralizing agent or before the addition of the neutralizing agent. When temperature is raised during the neutralization of the acid in the crude precipitate, ferrous sulphate heptahydrate is dried and looses its crystal waters. The used iron(II) heptahydrate originates also normally from the production process of titanium dioxide.

According to one embodiment of the present invention, to obtain a granular material having a high soluble iron(II) content the crude precipitate comprising ferrous sulphate monohydrate is mixed together with ferrous sulphate heptahydrate in order to form a pre-reaction mixture before addition of the neutralizing agent to the pre-reaction mixture obtained. Ferrous sulphate monohydrate and heptahydrate are first mixed mechanically together to form a pre-reaction mixture, which is in sludge or suspension form. When the pre-reaction mixture is in sludge or suspension form, the amount of neutralizing agent added to the pre-reaction mixture can be reduced, as the mixing of sludge or suspension is easy and provides a homogenous mixing result. A more thorough homogenous mixing of the raw materials decreases the amount of neutralizing agent needed, as there is no need for adding a surplus neutralizing agent to compensate the poor mixing of the raw materials. At the same time the reaction temperature is reduced. The low reaction temperature reduces the oxidation of iron(II), thus ensuring high levels of soluble iron in the final product. The mixing of the pre-reaction mixture is conducted for a relatively short time, preferably for from 20 seconds to 2 minutes.

If no separate pre-mixing is conducted when ferrous sulphate heptahydrate is used, precipitated ferrous sulphate monohydrate is added to the mixing apparatus together with ferrous sulphate heptahydrate. After this the neutralizing agent is added to the mixing apparatus.

According to one embodiment of the present invention the wet precipitated ferrous sulphate heptahydrate is used without a drying step preceding the mixing of the reaction mixture, i.e. heptahydrate that is crystallized out of sulphuric acid in the titanium dioxide production can be used as such, without any additional drying steps after the filtration. No extra drying steps are needed, as the heat of the neutralization reaction is enough to dry the product to a desired level. Furthermore, the addition of wet ferrous sulphate heptahydrate affects the granulation in a positive manner. The amount of moisture present in the wet ferrous sulphate heptahydrate can be used to adjust the granulation tendency of the reaction mixture. The granulation of the reaction mixture is improved when ferrous sulphate heptahydrate has high moisture content. Precipitated ferrous sulphate heptahydrate has typically moisture content in the range of 3-7 weight-%, more typically in the range of 4-6 weight-%. Often precipitated ferrous sulphate heptahydrate from acid concentration plant has an acid content up to 2 weight-%.

Usually ferrous sulphate heptahydrate is not used for producing granular material having high soluble iron(II) content or for producing granular material with low solubility.

According to one preferred embodiment of the first aspect of the present invention the plant for producing granular material having a high soluble iron(II) content and for treating a precipitate comprising ferrous sulphate monohydrate originating from titanium dioxide production, comprises
  a high shear rate mixing apparatus capable of mixing liquid, paste-like and solid material, having
    a first feeding connection for precipitated ferrous sulphate monohydrate,
    a second feeding connection for neutralizing agent,
    a third feeding connection for water and
    an output connection,
  means for transporting the material from the output connection of the mixing apparatus and
  an after-cooler apparatus.

According to one preferred embodiment of the second aspect of the present invention the plant for producing granular material having a low solubility and for treating a precipitate comprising ferrous sulphate monohydrate originating from titanium dioxide production, comprises
  a high shear rate mixing having
    a first end and a second end,
    a first feeding connection for feeding crude precipitate comprising iron(II)sulphate and sulphuric acid to the mixing apparatus,
    a second feeding connection for feeding neutralizing agent to the mixing apparatus,
    a rotatable mixer arm
  at least one storage tank for storing neutralizing agent,
  a weighing apparatus for weighing neutralizing agent,
  transporting means for transporting the neutralizing agent from neutralizing tank to the weighing apparatus and from there to the second feeding connection of the mixing apparatus,
whereby the mixing apparatus comprises also a third feeding connection for addition of water or other granulating liquid to the mixing apparatus, the feeding connections being arranged between the first and second end of the mixing apparatus so that the third feeding connection is arranged after the first and second feeding connection before the second end of the mixing apparatus.

The different feeding connections and their placement relative to each other in the mixing apparatus are advantageously arranged as described above so that the problems stemming from the formed gases are minimized. Preferably, the feeding connections are arranged between the first and the second end of the mixing apparatus so that the third connection is arranged after the first and the second connections before the second end of the apparatus.

The mixing of the reaction mixture is preferably conducted by using a high shear rate mixing apparatus. The properties of the end product can be controlled by adjusting the mixing time. A longer mixing time influences the granule size by decreasing it. In other words, if an end product comprising granules with smaller diameter is needed, it would be advantageous to prolong the mixing time used.

The plant especially according to the second aspect of present invention is suitable for preparing granular material having low solubility from crude precipitate obtained from sulphate process of the titanium dioxide manufacture.

Any high shear rate mixing apparatus that is suitable for mixing liquids, paste-like and dry materials can be used in the present invention. The inside of the mixing apparatus as well as the mixing arms and blades are manufactured of acid-resistant material, such as duplex steel. Preferably the mixing apparatus comprises a plurality of mixing blades arranged to one mixing arm. The mixing arm is rotated by a motor unit connected to it. The batch volume of the mixing apparatus can be 500-3000 kg or 300-6000 $dm^3$. A typical peripheral velocity during the mixing is >15 m/s, or typically 12-18 m/s, sometimes even >18 m/s.

According to one embodiment of the present invention the mixing apparatus is an Eirich-mixer, preferably R-type Eirich-mixer, or a Lödige-mixer. Preferably a mixing apparatus operates on principle of the mechanically generated fluid bed. For example, the blades of the mixing apparatus can be arranged to rotate close to the inner wall of a horizontal, cylindrical drum of the mixing apparatus, whereby the materials to be mixed are thrown from the bed of product into the open mixing space. The mechanically generated fluid bed ensures intensive mixing in a short period of time. According to one preferred embodiment of the invention the mixing apparatus is a Lödige-mixer.

According to one embodiment of the invention the mixing apparatus comprises in addition to one main mixing arm also at least one, preferably several choppers. The choppers normally rotate with a high speed, about 3000 1/min and they improve the homogeneity of the mixing and decrease the grain size distribution of the granular material obtained. Choppers also effectively break large lumps that may be generated in the mixing apparatus. In a continuous mixing apparatus the choppers have a higher circumferential speed than the main mixing arm.

According to one embodiment of the invention the mixing speed is typically 100-600 rpm, sometimes 200-600 rpm, more typically 350-450 rpm. The mixing can be conducted so that the mixing speed is faster in the beginning of the mixing, for example 400-500 rpm, and slower in the end of mixing, for example 250-350 rpm. When an Eirich-mixer is used the mixing speed is typically at least 300 rpm, sometimes even up to 800 or 1000 rpm. After the addition of the neutralizing agent the mixture is mixed for a few minutes, typically for 2-10 minutes. In some cases it might be necessary to use higher mixing speed also in the end of the mixing, during the so called final mixing.

The mixing can be done either as batchwise or continuous process. According to one preferred embodiment of the invention the mixing is arranged as a continuous process. The mixing apparatus comprises an output connection, through which the obtained granular material is exited from the mixing apparatus. The output connection is arranged after the third feeding connection for water. Preferably the output connection is arranged near the second end of the mixing apparatus, so that the residence time, i.e. mixing and granulation time, for the reaction mixture and water can be maximized. The granules can be exited for example to a conveyor, which transports then to a storage tank or to an after-cooler apparatus.

One of the advantages of a continuous process is the easier handling of exhaust gases that are formed during the mixing of the reaction mixture in the mixing apparatus. In a continuous process the amount of gases to be treated is relatively constant all the time and no significant peak loads exist, contrary to the batchwise process. In a continuous process it is also easier to control the size of the obtained granular material, because the size of the granules exiting the mixing apparatus can be controlled continuously with a suitable monitor or sensor, and the amount of water fed to the mixing apparatus can be optimized based on the measurement values. A feed back circuit can be arranged, where the amount of water added to the mixing apparatus is controlled by the size of the granular material exiting from the mixing apparatus, or by the difference between the size of the granules and a set target value.

Water can be added by using suitable drop or spray forming nozzles situated at suitable locations.

According to one embodiment of the invention the plant may handle about 14 tons of crude precipitate per hour, but it is possible to build plants with higher or smaller capacity.

In one embodiment of the invention the mixing apparatus comprises a gas connection for removing the formed gases from the mixing apparatus. It is possible to connect a gas treatment apparatus to this gas connection for cleaning the removed gases. The gas connection is typically arranged after the third connection for feeding the water, near the second end of the mixing apparatus and near the optional outlet connection. The gases that are formed in the mixing apparatus normally comprise water vapour and dust. They may also comprise small concentrations of $H_2SO_4$ and HCl. The gas treatment apparatus comprises typically a wet scrubber, with which the gases may be cleaned. The gas treatment apparatus may comprise also other known cleaning devices, such as filters.

According to one embodiment of the invention the plant also comprises means for dispatching the steam from the high shear mixing apparatus for removing the steam generated during the drying of the reaction mixture under mixing. The mixing apparatus may also comprise means for collecting dust or fine-grained material from the apparatus. The gas treatment apparatus may also function as means for dispatching the steam and/or collecting dust.

If the reaction mixture after the addition of the neutralizing agent is still too moist and/or have too large particle diameter, an additional dosage of neutralizing agent can be added to the mixing apparatus. As concluded above, another or additional way to correct the properties of the reaction mixture is to increase the mixing time or mixing speed or both.

According to one embodiment of the invention the processing cycle of the reaction mixture is conducted for 7-30 min, preferably for 10-20 min. The processing cycle comprises the filling of the mixing apparatus with crude precipitate, mixing of the crude precipitate with the neutralizing agent, neutralization and terminal mixing, emptying the mixing apparatus and cooling of the obtained material. Typically the pre-mixing of the crude precipitate is conducted at the maximum for 1 min, the neutralization reaction for a few minutes and the terminal mixing for around 2 min. The duration of the pre-mixing may be very short, very typically only 20-30 seconds. Thus the typical processing cycle time is around 10 to 15 minutes. This enables four to six processing cycles per hour. It is of course possible to arrange the process and plant according to the present invention as a continuous process. For example, many of the possible high shear rate mixing apparatuses can be run as continuous mixing apparatuses.

In order to prepare granular material having low solubility the crude precipitate from titanium dioxide production is mixed with a neutralizing agent in a high shear rate mixing apparatus to form a relatively homogenous mixture. After this, water is added to the mixture. The chemical reactions occurring during the mixture raise the temperature of the mixture, whereby at least some of the water is evaporated. Normally the temperature of the mixture is between 110-120 ° C. When the water keeps evaporating the mixture starts to form granules under mixing, after which the obtained granules can be removed from the mixing apparatus. Typical mixing time is 2-10 min depending on whether the process is batchwise or continuous. Batchwise process may need a longer mixing time, usually around 10 min. Continuous processes use normally shorter mixing times, the mixing or material's residence time being around 2-3 min.

According to one embodiment of the invention the plant comprises a plurality of high shear mixing apparatuses, which can be connected in parallel or in series.

Due to the exothermic reactions that occur during the mixing phase the material coming out of the mixing apparatus is typically hot. The chemical reactions in the granules may continue for several hours after the formation of the granules, but they are ready to be transported for example to the spoil deposit immediately after their formation. The temperature of the granules is usually >100° C. when they exit the mixing apparatus.

The cooling of the end product can be done in an after-cooler apparatus, such as a drum-cooler. Preferably the after-cooler apparatus is a rotary drum. It can be used also as a granulation and/or finishing apparatus, as the rotating motion of the drum enhances the formation of granules with homogenous size distribution, and rounds off and hardens the granules to be cooled. It is also possible to arrange feeding connections for binding or coating agent(s) to the after-cooler apparatus, if for example it is desired to coat the granules with high soluble iron(II) content with suitable coating improving their properties, such as moisture resistance.

According to the preferred embodiment of the invention the mixing and granulation are done by using the same apparatus, i.e. the mixing apparatus functions also as a granulation apparatus. According to one embodiment of the invention, especially when the after-cooler apparatus is not a rotary drum, the plant can comprise a separate granulation apparatus, such as a rotary drum or the like. In that case the reaction mixture is removed from the mixing apparatus to the granulation apparatus after the reaction between the iron(II)sulphate monohydrate and heptahydrate and the neutralizing agent has been completed. In case the after-cooler apparatus is a rotary drum, it can also function as a granulation apparatus. It is also possible to add binding and/or coating agents to the separate granulation apparatus through suitable feeding connections. The binding agents can e.g. be sprayed by using nozzles.

When preparing granular material having a high soluble iron(II) content the plant according to present invention comprises preferably a classifier, such as sieve or screen, for separation of the obtained end product to different size fractions. The obtained end product is then stored, and typically transported as bulk material. Transportation may be conducted by using cargo ships, trucks or both. The plant may comprise also a packing apparatus for packing the obtained end product in a suitable manner for storage and transport. Sometimes the end product is packed in paper or plastic sacks.

According to the first aspect of the invention, by using the method and plant of the present invention it is easy to manufacture material both in granule or powder form by adjusting the moisture content of the reaction mixture. The present invention thus enables the production of granular material showing good iron(II) solubility, high iron(II) content, good flow properties and good storage life properties. The material obtained is furthermore relatively homogenous, i.e. the granules have narrow size distribution. Typically the soluble iron (II) content is 12.5-17.7 weight-%, more typically 13-17 weight-%, often 14-16 weight-%, sometimes 14-18 weigh-% or 15-18 weight-%. The material is easy to dose due to its granule form, as the creation of dust is minimised during the handling of the product. It can be also blown and it does not melt during pumping.

When the end product is prepared in granulate form typically 75% of granules are of size >0.5 mm, and usually 75% of these granules are in the range of 1-10 mm. Granular material does not need to be of unitary size. It is possible to further optimize or control the deviation of the granule size by sieving. After sieving the granules are typically in the range of 1-7 mm, more typically 2-6 mm.

According to the invention the dusting value for the granule fraction having a diameter in the range of 1-7 mm is lower than 1000 mg/kg, typically lower than 500 mg/kg, sometimes lower than 400 mg/kg, and sometimes even about 300 mg/kg, especially for granules having high soluble iron(II) content. Dusting values given here are obtained by placing 400 g of the end product into a column where they are kept fluidized by suction for 2 minutes. The dust that comes loose is collected on filter paper and weighted. The result is given as milligrams per one kilogram of the end product. This implies that the obtained end product is easy to handle as low levels of dust is generated. In practice, during normal storage, transport and usage the end product can be considered almost as dust free.

According to one embodiment of the invention the granules having a high soluble iron(II) content show that the abrasion value for the granule fraction having a diameter in the range of 1-7 mm is less than 70 weight-%, usually 15-60 weight-%, typically around 25 weight-%. Abrasion values given here are obtained by placing 200 grams of end product granules and steel balls with a diameter of 10 mm into a drum, which is rotated for 30 min. Abrasion value indicates the amount of particles that were ground during the drum rotation due to the abrasion and shearing. Low abrasion value indicates that the obtained end product does not break apart during transportation and handling, for example when it is conveyed with mechanical conveyors.

According to one embodiment of the invention the bulk density value for the granule fraction having a diameter in the range of 1-7 mm is 2-1 kg/l, typically around 1.4 kg/l. The product shows thus good flowing properties when it is fed from a silo, and it is easy to feed to a cement kiln during the cement manufacture.

According to one embodiment of the invention, the granules having a high soluble iron(II) content show that a crushing strength value for the granule fraction having a diameter in the range of 1-7 mm is >20 N, typically 30-150 N, more typically 80-120 N, quite often 90-105 N. Crushing strength values given here are obtained by measuring the strength in Newtons that is needed for crushing a particle of a certain size. The measurement is made for 30 individual particles and the result is given as the average of the individual values. Crushing strength is dependent on the size of the particle, generally larger particles are stronger than the small ones. The end product according to present invention shows an improved hardness that makes it suitable for use in e.g. cement manufacture. The product is easy to feed evenly, which improves the even distribution of the reducing iron(II) into the cement mixture. Normally the product is added in granule form to the cement mixture in a grinder or classifier after the grinder. The granules are ground into the cement mixture in the final grinding of the mixture.

The amount of acid in the end product is usually less than 5 weight-%, usually 0.1-3 weight-%, more typically 0.5-2 weight-%.

In a certain embodiment of the present invention the material can be taken out from the mixing apparatus in powder form, having a mean particle size of 100 μm or under. This kind of material is preferred when the material according to the present invention is used as a reducing agent in cement factories where reducing agent is added directly to the cement in packing stage.

When used as a reducing agent in the cement manufacture the product according to the present invention can be dosed to the cement mixture in similar doses than known reducing agents.

The storage life of the product according to the present invention is at least as good, possibly even better than that of pure iron(II)sulphate. Especially when the product is in granule form it shows improved storage properties.

The granular material according to the present invention can also be used for cleaning of effluent waters, especially of effluent waters comprising high amounts of Cr(VI). The granular material can be used also as flocculation agents in sewage treatment plants instead of the sulphate heptahydrate.

According to another embodiment of the present invention it is possible to produce granules having a low solubility that can be safely dumped on spoil deposit. Typical granular material having a low solubility comprises 10-25 weight-% calcium and 5-17.5 weight-% iron. The diameter of the granules is typically >0.5 mm, and pH>9. Furthermore, the granule fraction having diameter 1-7 mm shows typically a crushing strength >10 N.

Typically the low-soluble granular material comprises typically 12.5-22.5 weight-%, more typically 15-20 weight-% calcium and 7.5-15 weight-%, more typically 8-12.5 weight-% iron.

According to one embodiment of the invention the dusting value for granular material having a low solubility is less than 4000 mg/kg, typically even less than 3000 mg/kg, sometimes less than 1500 mg/kg and sometimes even less than 1000 mg/kg, measured for a granular fraction having a diameter of 1-7 mm. The measurement was made after after-cooling apparatus and sieving.

According to one embodiment of the invention the abrasion value for granular material having a low solubility is less than 70 weight-%, normally 20-65 weight-%, typically about 25-40 weight-%, measured for a granular fraction having a diameter of 1-7 mm. Sometimes the abrasion value is less than 10 weight-%, sometimes even <5 weight-%, measured for a granular fraction having a diameter of 1-7 mm.

According to one embodiment of the invention the granular material having a low solubility has normally a bulk density of 1-2 kg/l, typically 1.4 kg/l, measured for granular fraction having diameter 1-7 mm.

According to one embodiment of the invention the low-soluble granular material show crushing strength for a granule fraction having a diameter of 1-7 mm of >10 N, typically 15-100 N, more typically 17-60 N, often 20-50 N. Crushing strength is determined as described above.

All values given here are measured from well-mixed end product. The used experimental techniques for measuring crushing strength, abrasion and dusting are also described in handbook "Fertilizer Manual", published by International Fertilizer Development Center and United Nations Industrial Development Organization (3. edition).

The invention is described in more detail with the aid of the following Figure, in which FIG. 1 shows schematically a plant according to one embodiment of the present invention In FIG. 1 is shown schematically a plant for preparing granules according to one embodiment of the present invention. Neutralizing agents are fed from storage tanks 1, 2 to a weighing apparatus 3. In the embodiment shown in FIG. 1, both CaO and Ca(OH)$_2$ are used as neutralizing agents, i.e. their mixture is used for neutralization of the crude precipitate originating from the titanium dioxide manufacture. From weighing apparatus 3 the right amount of neutralizing agent is transported by using a transporting means 4, such as a screw feeder, to the high-shear rate mixing apparatus 5. In addition to the neutralizing agent, or mixture of neutralizing agents, also crude precipitate comprising iron(II)sulphate monohydrate and sulphuric acid is fed from the storage container 6. The storage container 6 is arranged on a weighing apparatus (not shown) and its feed can be controlled by controlling the transport means 7. For example, when using a screw feeder the feed amount can be controlled by controlling its speed of rotation. Water is added to the mixing apparatus 5 via feeding connection 5'.

The granules that are formed in the mixing apparatus 5 can be removed directly from the process by using transport means 8 or they can be transported by using transport means 8' via an elevator 9 to the after-cooler apparatus 10, such as a drum cooler. Dust is removed from the process by using conduits 11, 11', 11" to a gas scrubber (not shown).

From the after cooler apparatus 10 the granules are transported by using transport means 12 and elevator 9' to a sieving apparatus 13 in which the granules are sieved to different fractions.

The invention is described further with the aid of the following examples, which should be considered as non-limiting for the scope of the invention.

EXAMPLES

In the following examples 1 to 6 the pre-mixing time was varied from 30 seconds to about 1 minute. After the addition of the neutralization agent mixing was continued for 4-5 minutes. The mixing rate was about 350-500 rpm.

Example 1

Precipitated iron(II)sulphate monohydrate from 55% acid concentration step and iron(II) heptahydrate were mixed in proportion 2:1. Calcium oxide was added in an amount of 105 g/(kg precipitated iron(II)sulphate monohydrate), resulting a pH 2.0-2.1 and a reaction temperature about 100° C. The end product was in granulate form, showing an iron(II) content of 17-18 weight-%.

Example 2

Precipitated iron(II)sulphate monohydrate from 70% acid concentration step and iron(II) heptahydrate were mixed in proportion 3:1. Calcium oxide was added in an amount of 166 g/(kg precipitated iron(II)sulphate monohydrate), resulting a pH 2.0-2.1 and a reaction temperature of 110-120° C. The end product was in the form of small granulates, which showed an iron(II) content of 13.5-14 weight-%.

Example 3

Precipitated iron(II)sulphate monohydrate from 55% acid concentration step, precipitated iron(II)sulphate monohydrate from 70% acid concentration step and iron(II) heptahydrate were mixed in proportion 35:35:30. Calcium oxide was added in an amount of 133 g/(kg precipitated iron(II)sulphate monohydrate), resulting a pH 2.0-2.1 and a reaction temperature of 80-90° C. The end product was in the form of small granulates, which showed an iron(II) content of 15-16 weight-%.

Example 4

Precipitated iron(II)sulphate monohydrate from 70% acid concentration step and iron(II) heptahydrate were mixed in proportion 4:1. Calcium oxide was added in an amount of 166.3 g/(kg precipitated iron(II)sulphate monohydrate), resulting a pH 2.0-2.1 and a reaction temperature of 110-120° C. The end product was in form the of fine powder, which showed an iron(II) content of 13.5-14 weight-%.

Example 5

Precipitated iron(II)sulphate monohydrate from 55% acid concentration step and iron(II) heptahydrate were mixed in proportion 4:1. Calcium oxide was added in an amount of 94-95 g/(kg precipitated iron(II)sulphate monohydrate), resulting a pH 2.0-2.1 and a reaction temperature of 90-100° C. The end product was in the form of fine powder, which showed an iron(II) content of 17.5-18.3 weight-%.

Example 6

Precipitated iron(II)sulphate monohydrate from 55% acid concentration step, precipitated iron(II)sulphate monohydrate from 70% acid concentration step and iron(II) heptahydrate were mixed in proportion 52:26:20. Calcium oxide was added in an amount of 123-124 g/(kg precipitated iron(II) sulphate monohydrate), resulting a pH 2.0-2.2 and a reaction temperature of 80-90° C. The end product was in powderous form, showing an iron(II) content of 15.3 weight-%.

Example 7

84 kg precipitated iron(II)sulphate monohydrate and 21.5 kg iron(II)sulphate heptahydrate were added to the mixing apparatus. Before starting of the pre-mixing, 4.5 kg water was added to the mixing apparatus. The pre-mixing took approximately 30 seconds.

After the pre-mixing step 6.0 kg calcium oxide was added in the beginning of the actual mixing procedure with a screw feeder directly to the mixing apparatus. The reaction mixture was the mixed for approximately 5 minutes, after which the obtained material was emptied on a conveyor.

The obtained material was transported to a cooling drum, after which the material was screened to three different fractions. The finest fraction was taken to a silo from which it could be recycled back to the process if needed, the product fraction was directly prepared for transport and/or storage and the third, coarsest fraction was packed in sacks.

Example 8

Crude precipitate was fed to a continuously operated mixing apparatus with a speed of 1000 kg/h. Finely comminuted CaO and water were fed to the same mixing apparatus with speeds of 120 kg/h and approximately 120 kg/h, respectively. The residence time in the mixing apparatus was 2-3 minutes. Granular material was obtained, the temperature on the granulates being 100-110° C. when they were exited from the mixing apparatus. The evaporation of the water continued after the granular material was exited from the mixing apparatus.

The mixing apparatus was a ploughshare intensive mixer equipped with two choppers. The volume of the used mixer was 300 dm³. The speed of rotation for the main mixer axis was 130 1/min and for the choppers 3000 1/min. Approximately 500 kg of granulous material was produced under 30 minutes test operation.

The granular material obtained was analyzed for iron content and pH. Fe(II) content was 15 weight-% and Fe(III) content was 0.1 weight-%. Measurement for pH was carried out in 10% Fe-solution and the value obtained was 3.8.

It was concluded that it was possible to use continuously operating mixing apparatus for converting the crude precipitate into easily soluble granulous material with high Fe(II) content.

Example 9

Preparation of Granular Material Having Low Solubility

Crude precipitate was fed to a continuously operated mixing apparatus with a speed of 900-1000 kg/h. Finely comminuted CaO and water were fed to the same mixing apparatus with speeds of 400 kg/h and approximately 500 kg/h, respectively. By varying the amount of water the degree of granulation could be controlled.

The residence time in the mixing apparatus was 2-3 minutes. Granular material was obtained, the temperature of the granulates being 100-110° C. when they were exited from the mixing apparatus. The evaporation of the water continued after the granular material was exited from the mixing apparatus.

The mixing apparatus was a ploughshare intensive mixer equipped with two choppers. The volume of the used mixer was 300 dm³. The speed of rotation for the main mixer axis was 150 1/min and for the choppers 3000 1/min.

The tests were done in two intervals: first for 3.5 hours after which the cleanness of the mixing apparatus was visually estimated. No significant dirtying could be observed. After this, a continuous test interval of 6 hours was executed. Approximately 15 tons of granulous material was produced during the test intervals.

The granular material obtained was analyzed according to standard SFS-EN 12457-2 (becoming effective on Dec. 2, 2002) for determining soluble components. The results are shown in Table 1.

The obtained results show that the method could be used for producing granules having a low solubility. The test showed also that granulous material with low solubility could be prepared from crude precipitate in one step process using continuously operated mixing apparatus.

TABLE 1

Results for granular material from shaking test according to standard SFS-EN 12457-2.

| Measured Unity | Unity | Obtained Value |
| --- | --- | --- |
| pH | | 12.2 |
| Conductivity | mS | 7.7 |
| SO$_4$ | mg/kg | 15 000 |
| Al | " | <5 |
| Ba | " | <1 |
| Ca | " | 9800 |
| Cl | " | 25 |
| Co | " | <1 |
| Cr | " | <1 |
| Cu | " | <1 |
| F | " | <10 |
| Fe | " | <1 |
| Mg | " | <1 |
| Mn | " | <1 |
| Mo | " | <1 |
| Na | " | 2700 |
| Ni | " | <1 |
| Ti | " | <1 |
| Vn | " | <1 |
| Zn | " | <1 |
| As | µg/kg | <100 |
| Cd | " | <1 |

TABLE 1-continued

Results for granular material from shaking
test according to standard SFS-EN 12457-2.

| Measured Unity | Unity | Obtained Value |
|---|---|---|
| Hg | " | <10 |
| Pb | " | <100 |
| Sb | " | <100 |
| Se | " | <100 |

Example 10

Preparation of Granular Material having High Soluble Iron (II) Content

To a Lödige mixer having one main mixing arm and two side choppers and having a volume of 300 liters, was continuously fed 1000 kg/h crude precipitate comprising iron(II) monosulphate and sulphuric acid in amounts of 13.3 weight-% Fe and 26.3 weight-% $H_2SO_4$. In addition to the precipitate, water was added to the mixing apparatus in an amount of 100 l/h and calcium hydroxide in an amount of 160 kg/h. A granular product was obtained, having pH 2 and iron(II) content 12.5 weight-%. After solubility determination it could be concluded that the granules comprised 16.5 weight-% of unsoluble material.

The operating speed of the main mixing arm was 132 1/min and of the choppers 3000 1/min.

It will be appreciated that the present invention can be incorporated in the form of a variety of embodiments, only a few of which are disclosed herein. It will be apparent for the specialist in the field that other embodiments exist and do not depart from the spirit of the invention. Thus, the described embodiments are illustrative and should not be construed as restrictive.

The invention claimed is:

1. Method for controlling the solubility of granular material, the method comprising following steps:
    obtaining an amount of a crude precipitate comprising iron(II)sulphate monohydrate and sulphuric acid from titanium dioxide production,
    mixing the said precipitate and a neutralising agent in a mixing apparatus to obtain a reaction mixture, the temperature during mixing of the reaction mixture being allowed to increase at the most to a temperature of 120° C., characterised in
    mixing water with the reaction mixture in the said mixing apparatus, and
    keeping the amount of neutralising agent sufficient to give a pH value from 1.5 to 4 to the end product in order to obtain a granular material having a high soluble iron(II) content or
    keeping the amount of neutralising agent sufficient to give a pH value $\geq 9$ to the end product in order to obtain a granular material having a low solubility.

2. Method according to claim 1, characterised in that the neutralising agent and water are added to the said mixing apparatus and that the granules are formed in the said mixing apparatus during mixing without separate granulation step.

3. Method according to claim 1, characterised in that the reaction mixture comprises 55-95 weight-% of crude precipitate comprising iron(II) sulphate monohydrate for obtaining an end product having a high soluble iron(II) content.

4. Method according to claim 1, characterised in adding water to the reaction mixture in amount of 0.1-20 weight-%, in order to obtain a granular material having a high soluble iron(II) content.

5. Method according to claim 1, characterised in that an amount of ferrous sulphate heptahydrate originating from titanium dioxide production is mixed with the said crude precipitate before or during the addition of the neutralisation agent, the amount of added heptahydrate being 1-35 weight-% in order to obtain a granular material having a high soluble iron(II) content.

6. Method according to claim 5, characterised in that the said crude precipitate and ferrous sulphate heptahydrate are mixed together in order to form a pre-reaction mixture before the addition of the neutralising agent in order to obtain a granular material having a high soluble iron(II) content.

7. Method according to claim 6, characterised in that the mixing of the pre-reaction mixture is conducted for from 20 seconds to 2 minutes in order to obtain a granular material having a high soluble iron(II) content.

8. Method according to claim 1, characterised in that the neutralising agent is added in an amount of 35-55 weight-% and water in an amount of 40-60 weight-%, calculated as used crude precipitate in order to obtain an end product having low solubility.

9. Method according to claim 1, characterised in that crude precipitate comprising iron(II) sulphate monohydrate and sulphuric acid is unwashed, unreduced and unneutralised before its addition to the reaction or pre-reaction mixture.

10. Method according to claim 1, characterised in that the said crude precipitate is obtained from the concentration step of 55% sulphuric acid in the titanium dioxide production and/or from the concentration step of 70% sulphuric acid in the titanium dioxide production.

11. Method according to claim 10, characterised in that the proportion of the crude precipitate originating from the concentration step of 55% sulphuric acid to the crude precipitate originating from the concentration step of 70% sulphuric acid is 1:2-1:1 in order to obtain a granular material having a high soluble iron(II) content.

12. Method according to claim 1, characterised in adding the neutralising agent in an amount sufficient to give a pH value from 1.7 to 2 to the end product in order to obtain a granular material having a high soluble iron(II) content.

13. Method according to claim 1, characterised in adding the neutralising agent in an amount sufficient to give a pH value from 9 to 12 to the end product in order to obtain a granular material having a low solubility.

14. Method according to claim 1, characterised in using a neutralising agent that forms gypsum under mixing of the reaction mixture.

15. Method according to claim 14, characterised in using calcium hydroxide, dehydrated lime, calcium oxide, limestone, dolomite or magnesium oxide as the neutralising agent.

16. Method according to claim 15, characterised in using calcium hydroxide or calcium oxide as the neutralising agent.

17. Method according to claim 1, characterised in that the processing cycle of the reaction mixture is conducted for 7-30 min.

18. Granular product having a iron(II) content of 12-18 weight-% and comprising gypsum, characterised in that the dusting value for the product fraction having a diameter in the range of 1-7 mm is lower than 1000 mg/kg.

19. Product according to claim 18, characterised in that it comprises granular material, where 75% of the granules are of size >0.5 mm.

20. Product according to claim 18, characterised in that the abrasion value for the granule fraction having a diameter in the range of 1-7 mm is less than 70%.

21. Product according to claim 18, characterised in that the bulk density value for the granule fraction having a diameter in the range of 1-7 mm is 2-1 kg/l.

22. Method for cleaning effluent or sewage water, wherein the product according to claim 18 is added to effluent or sewage water.

23. Method for manufacturing cement, wherein the product according to claim 18 is added as a reducing agent.

24. Method for treating sewage, wherein the product according to claim 18 is added as a flocculation agent.

* * * * *